United States Patent
Tomlinson, Jr. et al.

(10) Patent No.: US 6,298,229 B1
(45) Date of Patent: *Oct. 2, 2001

(54) GPS RECEIVER FOR EMERGENCY LOCATION REPORTING DURING INTERMITTENT SHADOWING

(75) Inventors: Harold Woodruff Tomlinson, Jr., Scotia; Daniel David Harrison, Delanson, both of NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,722

(22) Filed: Dec. 4, 1998

(51) Int. Cl.[7] .................................................. H04M 11/00
(52) U.S. Cl. .......................... 455/404; 455/456; 455/427; 342/357.06; 342/357.09; 701/213
(58) Field of Search ..................................... 455/456, 404, 455/427; 342/357.06, 357.08, 357.09, 357.1, 457; 710/207, 213, 214, 216

(56) References Cited

U.S. PATENT DOCUMENTS

| 5,528,247 | * | 6/1996 | Nonami | 342/357.1 |
| 5,736,962 | * | 4/1998 | Tendler | 342/357.1 |
| 5,752,218 |   | 5/1998 | Harrison et al. | 701/207 |
| 5,963,861 | * | 10/1999 | Hanson | 455/422 |
| 6,104,340 | * | 8/2000 | Krasner | 342/357.1 |
| 6,108,558 | * | 8/2000 | Vanderspool, II | 455/456 |

* cited by examiner

Primary Examiner—Nay Maung
Assistant Examiner—L. West
(74) Attorney, Agent, or Firm—John F. Thompson; Jill M. Breedlove

(57) ABSTRACT

A controller in a mobile telephone periodically commands GPS circuitry in the mobile telephone to power-on, capture and process GPS satellite signals. The signals are processed to obtain pseudo-range or time-difference data for at least one GPS satellite. After the signals are processed, the pseudo-range or time-difference data, GPS time, and satellite numbers are stored in non-volatile random access memory (RAM) and the GPS circuitry is powered off. When an emergency signal is present, the controller first commands the GPS circuitry to power-on, capture and process signals from four GPS satellites. If signals from at least four satellites are not present, the information stored in non-volatile RAM is read out. The processed data (if available), or else the data read out of the non-volatile RAM, are reported to a central location through the mobile telephone transmitter. The central location can then use the data to compute the present or last valid GPS location of the GPS receiver. The periodic sampling of the GPS signal minimizes power consumption and obtains a valid GPS location before shadowing occurs.

23 Claims, 3 Drawing Sheets

GPS RECEIVER FOR EMERGENCY LOCATION REPORTING DURING INTERMITTENT SHADOWING

BACKGROUND OF THE INVENTION

1. Field of the Invention

This invention generally relates to mobile telephones and, more particularly, to a global positioning satellite (GPS) receiver incorporated into a mobile telephone for emergency location reporting during intermediate shadowing of the receiver.

2. Description of the Prior Art

The space-based global positioning system (GPS) implemented by the United States Department of Defense constitutes a convenient instrumentality for determining geographical position in real time. The GPS is a multiple satellite-based radio positioning system in which each satellite transmits data that allow precise measurement of the distance from selected ones of the GPS satellites to the antenna of a user's receiver so as to enable the user to compute position, velocity and time parameters through known triangulation techniques. The signals provided by the GPS can be received both globally and continuously.

The GPS is intended for use in a wide variety of applications, including space, air, sea and land vehicle navigation, precise positioning, time transfer, altitude referencing and surveying. A typical GPS receiver comprises a number of subsystems, including an antenna assembly, an RF (radio frequency) assembly, and a GPS processor assembly. The antenna assembly receives and amplifies the L-band GPS signal prior to insertion into the RF assembly. The RF assembly mixes the L-band GPS signal down to a convenient intermediate frequency (IF) signal. This signal is then fed to the GPS processor assembly where the PRN (pseudo random) code modulating the L-band signal is tracked through code-correlation at the receiver. This provides the processing gain needed to achieve a signal-to-noise (S/N) ratio sufficient for demodulating the navigation data and signal-transmission time stamp. The Doppler shift of the received L-band signal is also measured through a carrier tracking loop. The code correlation and carrier tracking functions can be performed using either analog or digital signal processing.

By differencing the signal transmission time with the time of reception, as determined by the clock of the receiver, the (pseudo) range between the receiver and the satellite being tracked may be determined. The pseudo-range includes both the true range to the satellite and the affected offset of the receiver clock from the GPS master time reference. The pseudo range and Doppler measurements (and navigation data) from four satellites are used to compute a three dimensional position and velocity fix, and to calibrate the receiver's clock offset and provide an indication of GPS time. Other approaches are possible, as described in co-pending patent application Ser. No. 08/924,478 filed Aug. 25, 1997, now U.S. Pat. No. 5,752,218, issued May 12, 1998, by Daniel D. Harrison for "Reduced Power GPS-Based System for Tracking Multiple Objects from a Central Location". General information on GPS may be obtained from the book by Tom Logsdon entitled *The Navstar Global Positioning System*, published by Van Nostrand Reinhold (1992).

GPS receivers are now being placed in mobile telephones so that the telephone location can be reported to a central location during an emergency. U.S. legislation has mandated that by the year 2000 mobile telephone position be provided for all 911 calls. If a GPS receiver is used to obtain the telephone location, a position fix is not possible when the telephone is shadowed from the GPS satellites. Shadowing may occur when the telephone is indoors.

SUMMARY OF THE INVENTION

Accordingly, it would be desirable to provide periodic low-power GPS data in a mobile telephone, from which a GPS postion fix can be obtained, and to validate and store the data so that the most recent data are available whenever the telephone is shadowed.

According to a preferred embodiment of the invention, a controller in the mobile telephone periodically commands GPS circuitry, also in the mobile telephone, to power-on, capture and process the signals from the GPS satellites. The signals are then processed to the point that sufficient data are obtained to determine a GPS position fix. Such data may be pseudo-range data or propagation time-difference data, as described in co-pending patent application Ser. No. 08/924, 478, now U.S. Pat. No. 5,752,218. After the signals are processed, the pseudo-range or propagation time-difference data, GPS time, and satellite numbers are stored in non-volatile random access memory (RAM) and the GPS circuitry is then powered off. When an emergency signal is present, the controller tries to capture and process signals from the GPS satellites. If no GPS signals are received, the controller reports the stored information in non-volatile RAM to a central location through the mobile telephone transmitter. The central location can then use the information to compute the last valid GPS location of the GPS receiver. The periodic sampling of the GPS signal reduces power consumption and obtains a valid GPS location before shadowing occurs.

The invention is applicable to a variety of mobile telephones, including cellular telephones and satellite telephones. According to one aspect of the invention, the amount of data that needs to be transmitted to a central location is minimized and, therefore, power is saved by using the general location or region of the mobile telephone at the central location to resolve ambiguity in time-difference measurements. For a cellular telephone, the general location or region is the cell in which the cellular telephone is broadcasting. For a satellite telephone, the general location or region is the satellite beam location.

DETAILED DESCRIPTION OF A PREFERRED EMBODIMENT OF THE INVENTION

Figure 1:
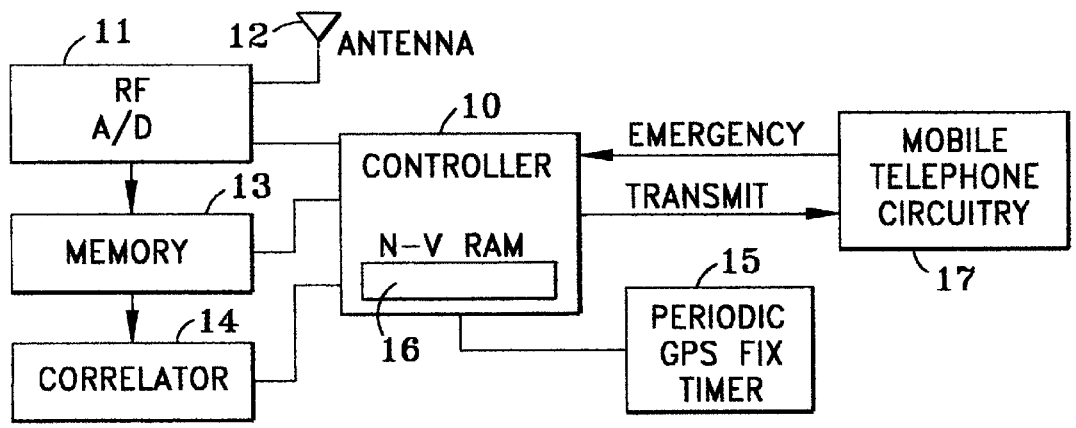
FIG. 1 is a block diagram of a preferred embodiment of the invention.

FIG. 1 is a block diagram of a preferred embodiment of the invention, incorporated in a mobile telephone and in communication with the telephone circuitry; however, for simplicity of illustration, the telephone circuitry is not represented in the diagram.

A controller 10, typically including a simple microprocessor (not shown), provides the interface between the mobile telephone circuitry 17 and the GPS components. The GPS components comprise radio frequency (RF) and analog-to-digital (A/D) circuitry 11 coupled to an antenna 12, memory 13, correlator circuits 14, and a GPS timer 15. Antenna 12 receives GPS signals and may be combined with the mobile telephone antenna.

To provide emergency location information, controller 10 periodically commands the RF and A/D circuitry 11, memory 13, and correlator circuits 14 to power-on, capture and process the RF signal from the GPS satellites. The RF signal from the GPS satellites is captured and converted to binary representations in RF and A/D circuitry 11 and stored in memory 13. The signal is then processed by correlator circuitry 14 to the point that pseudo-range or propagation time-difference data, as measured from code phase offset, are obtained for one or more GPS satellites. After the signal is processed, the pseudo-range or propagation time difference data, GPS time from timer 15, and satellite numbers are stored in nonvolatile random access memory (N-V RAM) 16 in controller 10. The RF and A/D circuitry 11, memory 13 and correlator circuits 14 are then powered off.

Figure 2:
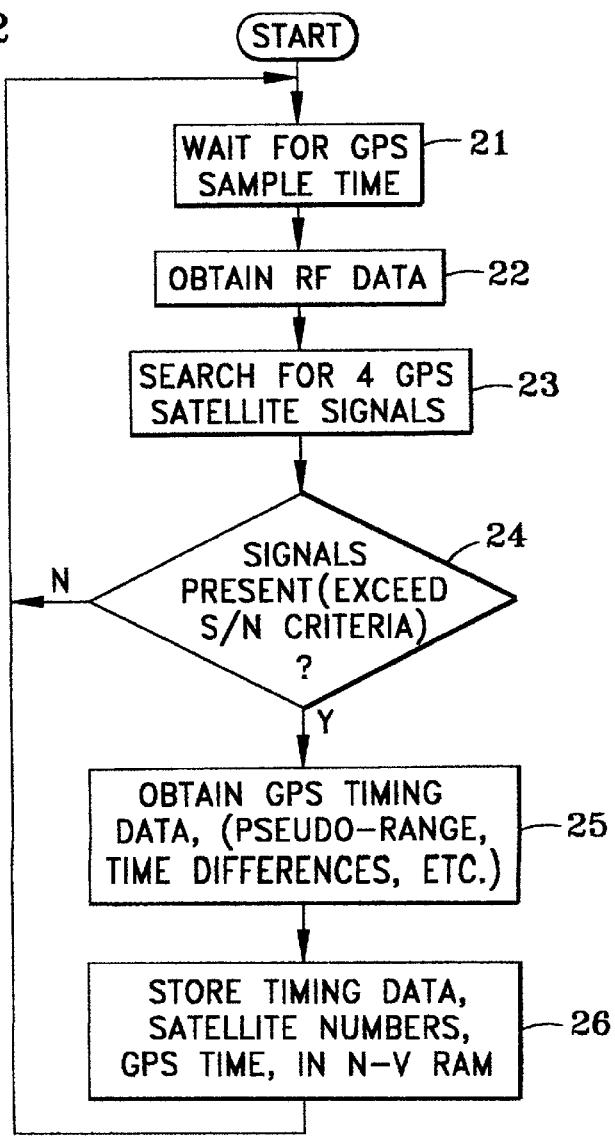
FIG. 2 is a flow chart of the process for obtaining and storing GPS data in non-volatile RAM.

The process of obtaining and storing GPS data is shown in more detail in the flow chart of FIG. 2. The system is initially in a wait state 21. During this time the circuitry related to obtaining the GPS position data can be in a "sleep" mode to conserve battery power. When the GPS sample time occurs, the process of obtaining RF data is initiated at step 22. This is done by searching for signals from the GPS satellites at step 23. If the signals are not present (e.g., the mobile telephone may be shadowed), as determined at step 24, the process loops back to step 21, and the circuitry reverts to the "sleep" mode until the next GPS sample time. If, on the other hand, GPS signals are present and satisfy a predetermined signal-to-noise (S/N) criteria, then at step 25, the GPS timing data (pseudo-range), propagation time-differences, or the like are obtained. These data are then stored in non-volatile RAM at step 26 before a return is made to step 21.

When an emergency signal (e.g., dialed number 911) is generated by mobile telephone circuitry 17, the signal is detected by controller 10. In response, controller 10 attempts to capture and process the RF signals from the GPS satellites, as in the process described with respect to FIG. 2. If there are GPS satellite signals that satisfy a predetermined signal-to-noise (S/N) criteria, psuedo-range or propagation time-difference data are obtained for the visible satellites, and those data are sent to a central location, i.e., a central station, through the mobile telephone transmitter. Otherwise, the controller reports the information stored in non-volatile RAM 16 to the central location through the mobile telephone transmitter. The central location can then use the information to compute the last valid GPS location of the GPS receiver, as described in co-pending patent application Ser. No. 08/924,478, now U.S. Pat. No. 5,752,218.

Figure 3:
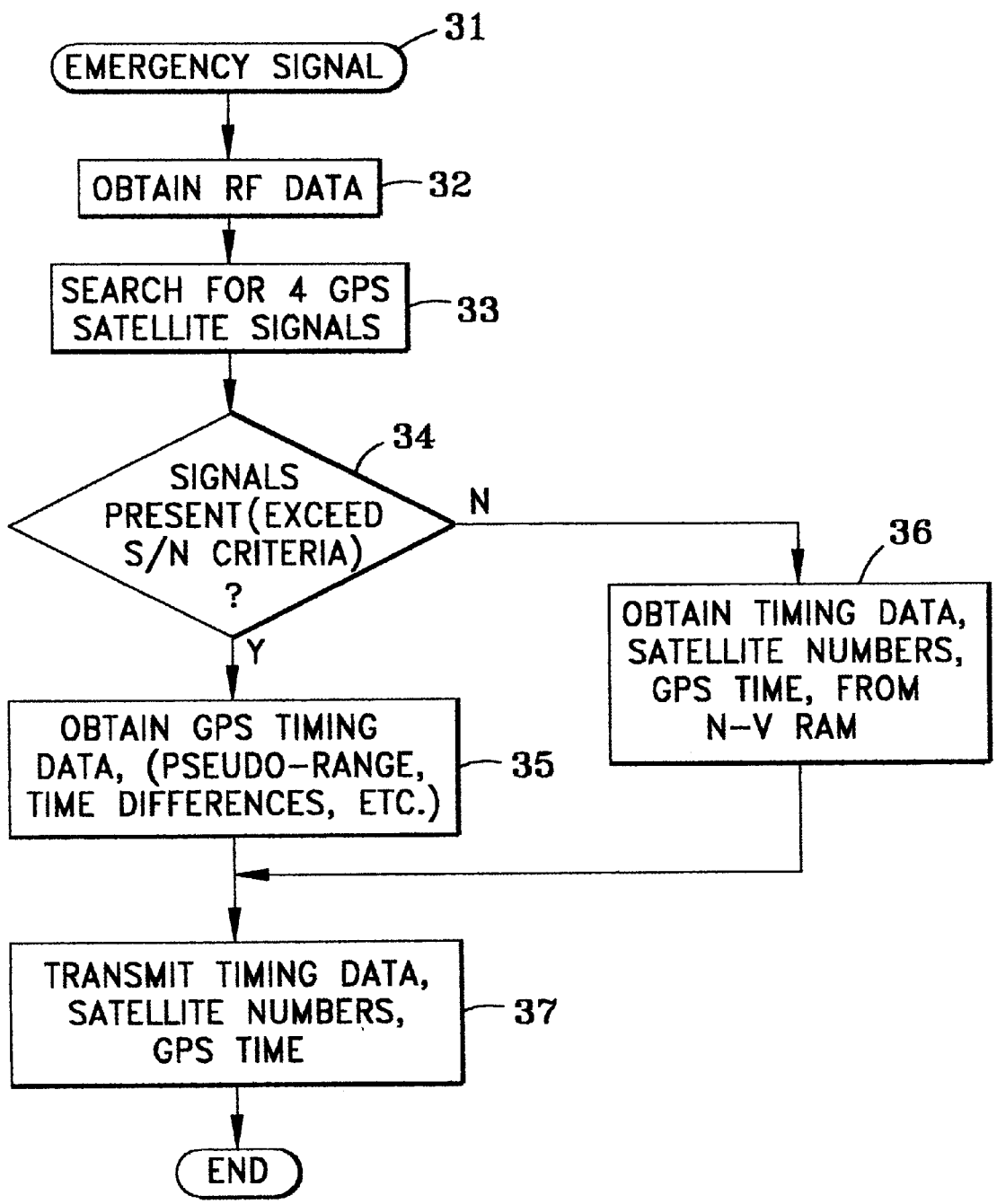
FIG. 3 is a flow chart of the process of responding to an emergency signal and transmitting GPS data to a central station.

The process of responding to an emergency signal is shown in more detail in the flow chart of FIG. 3. Upon detection of an emergency signal 31 (e.g., dialed 911), the process for obtaining RF data is initiated at step 32. A search for RF signals from four GPS satellites is made at step 33, and then a test is made at step 34 to determine if four signals are present. If four signals are determined to be present, the GPS timing data (pseudo-range), time-differences, or the like are obtained at step 35 by the same process as that shown in FIG. 2; however, if the four signals are not found (e.g., the mobile telephone may be shadowed), the process does not loop back; instead, the data stored in non-volatile RAM 16 are read out at step 36. The data obtained at step 35 or 36 are then formatted and transmitted at step 37.

An important aspect of this system is the periodic sampling of the GPS RF signal to reduce power consumption and provide a valid GPS location before shadowing occurs. Without periodic sampling, a conventional GPS receiver could be used if it is kept turned off until needed to obtain a location fix. During an emergency situation, the GPS receiver must be powered on and synchronized with the GPS satellite signals. This process typically takes 20 to 40 seconds if the RF signal is not shadowed. If the GPS receiver is shadowed during an emergency, the GPS receiver will be unable to obtain a valid fix. The system, according to a preferred embodiment of the invention, has such low power consumption that it can be powered up periodically for brief periods (approximately 250 ms.) to look for the presence of GPS RF signals. If the periodic sampling occurs fast enough (1/minute), a valid fix can be obtained even when the receiver is occasionally shadowed, assuming that the receiver has not moved significantly when it is shadowed (such as in a house).

Figure 4:
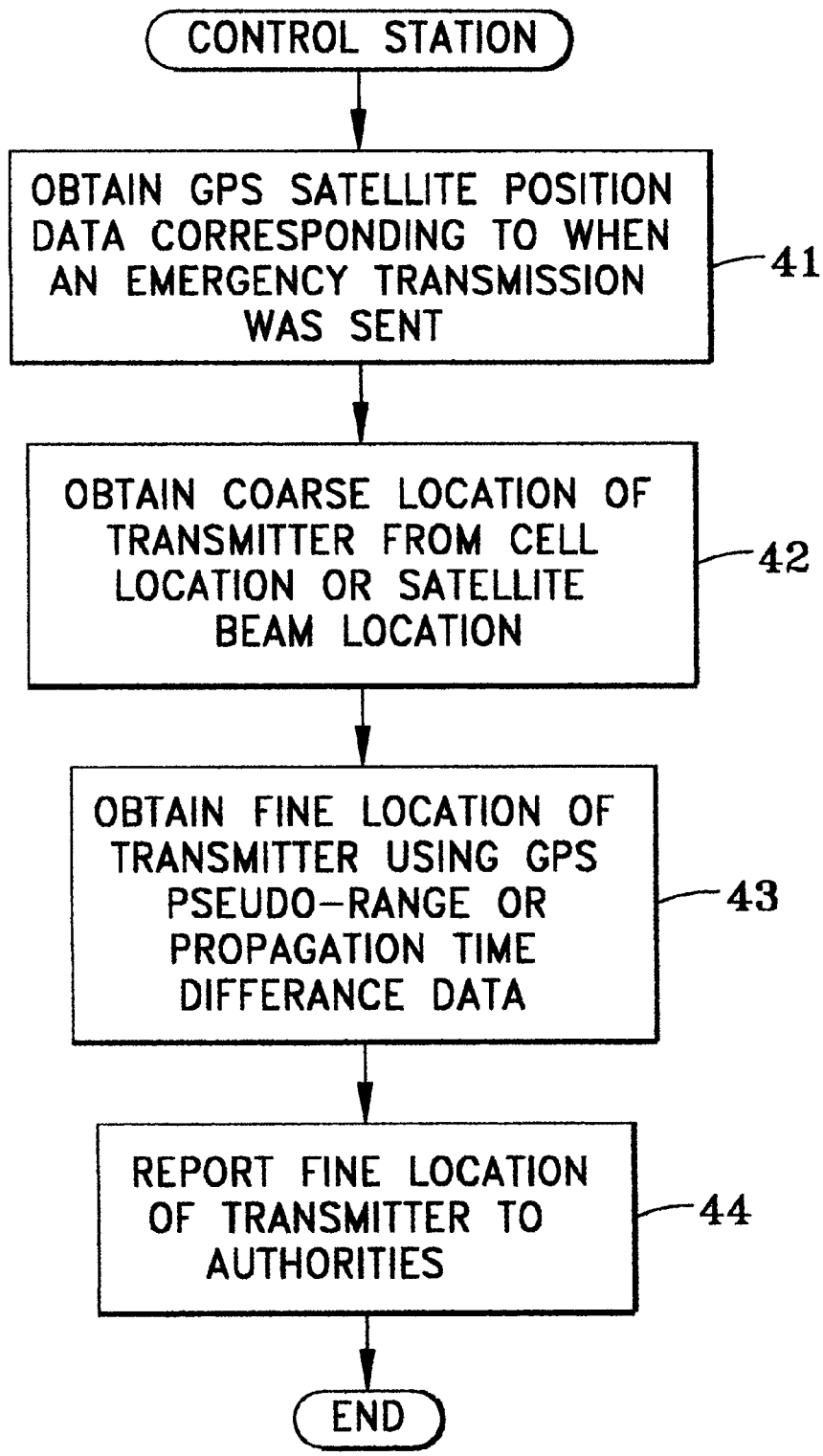
FIG. 4 is a flow chart of the process at the central station for resolving the ambiguity of reported location.

One problem with computing location from pseudo-range or time-difference data is location ambiguity that occurs when time differences are taken from code phase measurements. Since the GPS receiver is capturing data only for a short period of time (<0.1 sec.), location can be determined only by assuming that the GPS receiver lies within a region defined by the maximum time difference between GPS signals. Since the general location of a cellular telephone, for example, can be determined by locating the cell in which the telephone is broadcasting, the central site can use this information to resolve the location ambiguity in the time-difference measurements. For a satellite telephone, the beam location is used to resolve the ambiguity, as shown in FIG. 4. At the central site, the GPS satellite position data corresponding to when an emergency transmission was sent is received at step 41. At step 42, the coarse location of the transmitter is obtained from the cell location or the satellite beam location. At step 43, the fine location of the transmitter is obtained using GPS pseudo-range or propagation time-difference data in a manner well-known in the art. At step 44, the resolved fine location of the transmitter is reported to the authorities.

While only certain preferred features of the invention have been illustrated and described, many modifications and changes will occur to those skilled in the art. For instance, fewer than 4 GPS satellite signals can be used to obtain a location fix if the receiver elevation is known. Furthermore, signals from 5 or more satellites can be processed to reduce risk of obtaining poor position solutions due to associated poor satellite position data. It is, therefore, to be understood that the appended claims are intended to cover all such modifications and changes as fall within the true spirit of the invention.

What is claimed is:

1. A GPS receiver for periodically determining a location and reporting the location even during intermittent shadowing, the GPS receiver comprising:
   a GPS circuit comprising:
      an antenna;
      a radio frequency (RF) and analog-to-digital (A/D) circuit connected to the antenna;
      a memory device connected to the RF and A/D circuit; and
      a correlator circuit connected to the memory;
   a controller connected to the GPS circuit for periodically instructing the GPS circuitry to power on, retrieve and process a first number of RF signals from a plurality of GPS satellites to obtain first GPS location data wherein each of the first number of RF signals is retrieved from a different one of the plurality of GPS satellites;

a memory device connected to the controller for storing the first GPS location data; and an emergency signal generator connected to the controller and communicating an emergency signal to the controller, the controller commanding the GPS circuitry to power on in response to the emergency signal and a second number of RF signals is received from GPS satellites, each of the second number of RF signals is received from a different one of the plurality of GPS satellites, wherein if the second number of RF signals is equal to the first number of RF signals, the controller processes the second number of RF signals to obtain second GPS location data and provides the second GPS location data for transmittal to a central station, and wherein if the second number of RF signals is less than the first number of RF signals, the controller retrieves the first GPS location data from the memory device and provides the first GPS location data for transmittal to the central location.

2. The GPS receiver of claim 1 wherein the first number of RF signals comprises four RF signals.

3. The GPS receiver of claim 1 wherein the first GPS location data and the second GPS location data comprises pseudo-range data.

4. The GPS receiver of claim 1 wherein the first GPS location data and the second GPS location data comprises propagation time-difference data.

5. The GPS receiver of claim 1 wherein the controller comprises the memory device.

6. The GPS receiver of claim 1 wherein the memory device comprises a non-volatile random access memory (RAM).

7. The GPS receiver of claim 1 wherein the second GPS location data is stored in the memory device overwriting the first GPS location data.

8. The GPS receiver of claim 1 wherein the emergency signal generator comprises a mobile telephone, the mobile telephone comprising a transmitter connected to the controller and responding to an output signal from the controller to transmit GPS location data to the central location.

9. The GPS receiver of claim 8 wherein the emergency signal generator produces the output signal in response to a predetermined number dialed on the mobile telephone.

10. The GPS receiver of claim 9 wherein the predetermined number is 911.

11. A GPS receiver for periodically determining a location and reporting the location even during intermittent shadowing, the GPS receiver comprising:

a GPS circuit comprising:
an antenna;
a radio frequency (RF) and analog-to-digital (A/D) circuit connected to the antenna;
a memory device connected to the RF and A/D circuit; and
a correlator circuit connected to the memory;

a controller connected to the GPS circuit for periodically instructing the GPS circuitry to power on, retrieve and process four RF signals from a plurality of GPS satellites to obtain first GPS location data wherein each of the four RF signals is retrieved from a different one of the plurality of GPS satellites;

a memory device connected to the controller for storing the first GPS location data; and a mobile phone connected to the controller and communicating an emergency signal to the controller upon dialing a predetermined number, the controller commanding the GPS circuitry to power on in response to the emergency signal and a second number of RF signals is received from GPS satellites, each of the second number of RF signals is received from a different one of the plurality of GPS satellites, wherein if the second number of RF signals is equal to four RF signals, the controller processes the second number of RF signals to obtain second GPS location data, provides the second GPS location data for transmittal to a central station and stores the second GPS location data in the memory device, and wherein if the second number of RF signals is less than four RF signals, the controller retrieves the first GPS location data from the memory device and provides the first GPS location data for transmittal to the central location.

12. A method for periodically determining a location and reporting the location even during intermittent shadowing of a GPS receiver, the method comprising the steps of:

powering on the GPS receiver at a first time;

receiving a first number of RF signals using the GPS receiver during the first time wherein each of the first number of RF signals is received from a different one of a plurality of GPS satellites;

processing the first number of RF signals received during the first time to obtain first GPS location data used to determine the location;

storing the first GPS location determined from the first number of RF signals received during the first time;

powering down the GPS receiver after receiving the first number of RF signals during the first time;

responding to an emergency signal by powering on the GPS receiver at a second time;

receiving a second number of RF signals from GPS satellites during the second time wherein each of the second number of RF signals is received from a different one of the plurality of GPS satellites;

processing the second number of RF signals received during the second time to obtain second GPS location data and transmitting the second GPS location data to a central station wherein the second number of RF signals is processed and the second GPS location data is transmitted only when the second number is equal to the first number of RF signals; and retrieving the first GPS location data and transmitting the first GPS location data to the central station to obtain the location wherein the first GPS location data is retrieved and the first GPS location data is transmitted only when the second number is less than the first number of RF signals.

13. The method of claim 12 wherein the first number of RF signals comprises four RF signals.

14. The method of claim 12 wherein the first GPS location data and the second GPS location data comprises pseudo-range data.

15. The method of claim 12 wherein the first GPS location data and the second GPS location data comprises propagation time-difference data.

16. The method of claim 12 wherein if the step of processing the second number of RF signals received during the second time to obtain second GPS location data is performed, the second GPS location data is stored.

17. The method of claim 12 wherein the GPS receiver is incorporated into a mobile telephone comprising a transmitter and transmission of the first GPS location data and the second GPS location data is performed by the transmitter in the mobile telephone.

18. The method of claim 17 wherein the emergency signal is produced in response to a predetermined number dialed on the mobile telephone.

19. The method of claim 18 wherein the predetermined number is 911.

20. The method of claim 17 further comprising the step of resolving an ambiguity in the GPS location data at the central station based on a known transmitter region.

21. The method of claim 20 wherein the mobile telephone comprises a cellular telephone and the known transmitter region comprises a cell in which the cellular telephone is transmitting.

22. The method of claim 20 wherein the mobile telephone comprises a satellite telephone and he known transmitter comprises a satellite beam location in which the satellite telephone is transmitting.

23. A method for periodically determining a location and reporting the location even during intermittent shadowing of a GPS receiver, the method comprising the steps of:

powering on the GPS receiver at a first time;

receiving four RF signals using the GPS receiver during the first time wherein each of the four RF signals is received from a different one of a plurality of GPS satellites;

processing the four RF signals received during the first time to obtain first GPS location data used to determine the location;

storing the first GPS location determined from the first number of RF signals received during the first time;

powering down the GPS receiver after receiving the first number of RF signals during the first time;

responding to an emergency signal by powering on the GPS receiver at a second time;

receiving a number of RF signals from GPS satellites during the second time wherein each of the number of RF signals is received from a different one of the plurality of GPS satellites;

processing the number of RF signals received during the second time to obtain second GPS location data, transmitting the second GPS location data to a central station and storing the second GPS location data wherein the second number of RF signals is processed, transmitted and stored only when the second number of RF signals is equal to four RF signals; and retrieving the first GPS location data and transmitting the first GPS location data to the central station to obtain the location wherein the first GPS location data is retrieved and the first GPS location data is transmitted only when the second number of RF signals is less than four RF signals.

* * * * *